United States Patent [19]

Novak et al.

[11] Patent Number: 4,457,957

[45] Date of Patent: Jul. 3, 1984

[54] METHOD FOR APPLYING AN INORGANIC TITANIUM COATING TO A GLASS SURFACE

[75] Inventors: John H. Novak, Butler; Gary L. Smay, Saxonburg, both of Pa.

[73] Assignee: American Glass Research, Inc., Butler, Pa.

[21] Appl. No.: 181,621

[22] Filed: Aug. 26, 1980

Related U.S. Application Data

[63] Continuation-in-part of Ser. No. 112,602, Jan. 16, 1980, abandoned, and Ser. No. 171,095, Jul. 22, 1980.

[51] Int. Cl.³ ............................................. B05D 3/02
[52] U.S. Cl. .................................. 427/226; 65/60.52; 427/314
[58] Field of Search ............... 427/226, 314, 376.2, 427/384, 421, 427, 387; 428/35, 432, 447; 65/30 R, 60 R, 60 C, 60 B, 60 D, 111

[56] References Cited

U.S. PATENT DOCUMENTS

| | | | |
|---|---|---|---|
| 2,375,482 | 5/1945 | Lyle | 65/60 R |
| 2,523,461 | 9/1950 | Young et al. | 427/314 |
| 2,768,909 | 10/1956 | Haslam | 428/336 |
| 2,824,114 | 2/1958 | Bostwick | 260/404.5 R |
| 2,831,780 | 4/1958 | Deyrup | 65/60 B |
| 2,887,406 | 5/1959 | Homer | 427/229 |
| 2,926,183 | 2/1960 | Russell | 260/429.5 |
| 3,004,863 | 10/1961 | Gray et al. | 65/60 B |
| 3,047,535 | 7/1962 | Evans et al. | 427/387 |
| 3,051,593 | 8/1962 | Gray et al. | 427/384 |
| 3,071,482 | 1/1963 | Miller | 428/432 |
| 3,130,071 | 4/1964 | Brockett et al. | 65/60 B |
| 3,251,712 | 5/1966 | Berger | 427/314 |
| 3,387,994 | 6/1968 | Dunton et al. | 427/314 |
| 3,414,429 | 12/1968 | Bruss et al. | 427/226 |
| 3,667,926 | 6/1972 | Green et al. | 65/26 |
| 3,684,469 | 8/1972 | Goelzer et al. | 65/60 B |
| 3,926,103 | 12/1975 | Smith | 118/326 |

*Primary Examiner*—S. L. Childs
*Attorney, Agent, or Firm*—Kenyon & Kenyon

[57] ABSTRACT

An inorganic titanium coating, such as a hot end coating for glass containers, is applied to a glass surface by contacting the glass surface, which is at an elevated temperature, for example at least 371° C., with a solution of a tetraalkyl titanate such as tetraisopropyl titanium, in a vehicle comprising a normally liquid ester of a fatty acid or a silicone fluid.

6 Claims, No Drawings

METHOD FOR APPLYING AN INORGANIC TITANIUM COATING TO A GLASS SURFACE

RELATED APPLICATIONS

This application is a continuation-in-part of U.S. application Ser. No. 112,602 filed Jan. 16, 1980, abandoned, and Ser. No. 171,095 filed July 22, 1980.

This invention relates to an improved method for applying an inorganic titanium coating to a glass surface. More particularly, this invention is concerned with an improved method for applying an inorganic titanium hot end coating to a glass container.

BACKGROUND OF THE INVENTION

It has long been known that inorganic coatings can be applied to a glass surface by contacting a hot glass surface with a metal bearing compound which decomposes to form what is believed to be a metal oxide layer on the surface of the hot glass. Processes of this type were disclosed by Lyle in U.S. Pat. No. 2,375,482 for imparting an iridescent finish to glass.

More recently, processes of this type have been adapted for use in protective coatings for glass containers, particularly, beverage bottles and other similar containers. In these processes glass containers, such as glass bottles, while still hot from the bottle-forming equipment and before passage through the annealing lehr, are treated with a thermally-decomposable metal compound, such as stannic chloride or titanic chloride, under conditions such that a thin coating is formed on the container surface. This coating usually is thinner than that taught by Lyle, and serves to bond a lubricious organic polymer or wax coating applied to the container surface after the container exits from the lehr. This combination of metal oxide "hot end" coating and organic "cold end" coating has been found useful in improving the scratch resistance and lubricity of glass containers.

Although this combined coating has been found useful, the generally employed methods of applying a hot end coating have several drawbacks. Generally anhydrous compounds, especially anhydrous stannic or titanic chloride, were employed which led to numerous problems. First, it was necessary to entrain the metal halide vapors in a dry air stream, which normally is accomplished by bubbling dry air through a liquid metal halide. If moisture should be introduced into the resulting air stream, a precipitate results which may inhibit the flow of entrained metal halide vapors thereby causing a reduction in the amount of coating material supplied to the application chamber. Furthermore, reactions between the metal halide and water in the atmosphere or the pyrolysis of the metal halides results in a reaction product which is corrosive to the equipment employed in the production of glass articles. The reaction product also is noxious in odor, which often creates undesirable working conditions in the hot end of glass manufacturing plants. Other reaction products are particulate materials which are difficult to capture.

Next, it is difficult to ensure formation of a uniform hot end coating when anhydrous metal halide fumes are used because they can react with moisture in the atmosphere before contacting the glass surface. The results are non-uniform coating thickness and poor bottle-to-bottle reproducibility. Moreover, the loss of metal halide through such a reaction seriously reduces the efficiency of the use of the expensive metal halide reagent.

Finally, it is essential to prevent formation of a metal oxide coating on the finish, or mouth, of bottles particularly to avoid corrosion of bottle caps and high removal torques. This control is difficult to achieve with air streams containing entrained metal halide vapors, especially with the so-called "stubby" beer bottles which are commonly employed today.

To some extent, these problems can be avoided through use of sprays of aqueous or alcohol solutions of tin halide hydrates, as is disclosed in U.S. Pat. No. 3,819,346. However, such solutions are highly acidic and special equipment are required to handle the corrosive liquids. These coating materials also create noxious and corrosive reaction products upon their pyrolytic decomposition.

Not only have inorganic compounds, such as metal halides, been employed, but considerable effort has been devoted to the use of organo-metallic compounds. For example, Deyrup, in U.S. Pat. No. 2,831,750 issued Apr. 22, 1958, discloses applying vapors of a metallo-organic compound such as tetraisopropyl titanate to hot glass (450°–600° C.). According to Deyrup the corresponding inorganic compounds are either too heat stable or insufficiently volatile without decomposition to be suitable for such use. Subsequently, Gray et al, in U.S. Pat. No. 3,004,863 described a process in which aqueous solutions of certain aqueous acid-soluble titanates were applied to glass at room temperature and the glass was thereafter annealed, at which time the titanium oxide coating was formed. Still more recently, Green et al, in U.S. Pat. No. 3,667,926 issued June 6, 1972, disclosed a process wherein an aqueous solution of a water-soluble titanium composition was sprayed onto hot glass. As was the case with Deyrup and Gray et al, Green et al employed solutions of organo-titanium compounds.

U.S. Pat. No. 3,387,994 to Dunton et al discloses that an improved process for applying a titanium coating to glass comprises spraying a heated glass surface with an inert, non-aqueous organic solvent solution of a titanium ester complex. According to the patent, the ester complex is the reaction product of one mole of a tetraalkyl titanate, e.g., tetraisopropyl titanate, and one mole of a chelating agent, e.g., acetylacetone. Also according to the patent, the nature of the solvent can vary widely, and includes liquid hydrocarbons and halogenated derivatives and alcohols. Isopropyl alcohol is preferred, and was used in all of the Examples. It has been found, however, that the preferred process of Dunton et al using, e.g., tetraisopropyl titanate chelated with acetyl acetonate, in an alcohol solution does not yield a commercially practicable process.

As was the case with the inorganic compounds, the use of organo-metallic compounds was not entirely satisfactory. For example, the vapors of anhydrous organo-metallic compounds, such as tetraisopropyl titanate, react with moisture in the atmosphere and decompose. The results are non-uniform coating thicknesses and poor bottle-to-bottle reproducibility. When trying to spray liquid anhydrous organo-metallic compounds, the liquid reacts with moisture in the atmosphere and forms a solid deposit which tends to plug spray nozzles. Furthermore, the techniques previously employed to apply such compounds typically form finely dispersed particles which are entrained in the air stream, and are difficult to remove from it in a simple and economic fashion.

BRIEF SUMMARY OF THE INVENTION

It is an object of this invention to provide an improved method for applying a metal oxide coating to a glass surface.

It is a further object of this invention to provide an improved method of applying metal oxide hot end coatings to glass containers.

A still further object of this invention is to provide a simple, economical process for applying hot end metal oxide coatings to glass containers which is free of the problems associated with the use of anhydrous and various alcohol or aqueous solutions of metal halide reagents.

Another object of this invention is to provide an economical method for applying titanium oxide coatings to glass surfaces.

Still another object of this invention is to provide a method for employing organic titanium compounds as the thermally decomposable compound.

These and other objects of this invention, which are evident from the specification and claims, are achieved by spraying onto a heated glass surface a mixture of a tetraalkyl titanate in a normally-liquid vehicle which may be a fatty acid, a fatty acid ester, or a siloxane polymer.

The tetraalkyl titanate employed in accordance with this invention may be represented by the general formulae:

$$(RO)_4Ti$$

wherein R is alkyl of from 1 to about 3 carbons, and preferably from 2 to about 3 carbons. Although in theory the alkyl groups need not be the same, the commercially-available tetraalkyl titanates typically do have the same four alkyl groups. Suitable tetraalkyl titanates include tetramethyl titanate, tetraethyl titanate, tetrapropyl titanate, and tetraisopropyl titanate. Tetraisopropyl titanate is preferred.

The tetraalkyl titanates are generally available as technical products which are normally liquid, i.e., liquid under ambient conditions.

The second component of the mixture is a normally liquid organic material which serves as a carrier for the tetraalkyl titanate. Thus, it may act as a solvent for the tetraalkyl titanate, or it may serve simply to disperse the titanate. The function of the carrier is to form a fluid mixture of the tetraalkyl titanate which can be applied to the glass surface. It is preferred that the mixture be sufficiently fluid that it can be sprayed. To this end, carriers which form a mixture having a viscosity of less than about 100 centipoises at room temperature are preferred, with those forming a mixture having a viscosity of less than about 10 centipoises being especially preferred. The critical element is that the solvent which is employed be hydrophobic. It is believed that such a solvent avoids or minimizes the hydrolysis reaction which polymerizes organotitanates and contributes to the nozzle plugging problem.

One class of carriers which may be employed in accordance with this invention comprises esters of the higher fatty acids, i.e., fatty acids containing in excess of 10 carbons, atoms and preferably from about 15 to 20 carbon atoms, such as stearic acid, palmitric acid, oleic acid, linoleic acid and linolenic acid, which are normally liquid. The esters are those of the lower alcohols having up to 5 carbons, which may be monohydric or polyhydric alcohols having up to 3 hydroxyl groups.

Particularly preferred esters are the normally liquid glycerides of the higher fatty acids. These esters are readily available in the form of vegetable oils such as olive oil, cottonseed oil, linseed oil, soybean oil, safflower oil, tung oil, corn oil and the like.

A second class of useful vehicles comprises the normally-liquid siloxane polymers known as silicone fluids. These polymers may be represented by the general formulae:

$$\left[ R_n SiO_{\frac{(4-n)}{2}} \right]_m$$

wherein R is an organic, typically a hydrocarbon substituent, n is a number having a value from 0 to 3 and m is a number having a value of at least 2. The hydrocarbon substituent represented by R usually is lower alkyl, especially methyl, or phenyl, but it also may be fluoroalkyl or vinyl. Dimethylsilicone fluids are obtained by reacting dimethyl silicone stock, either as a crude fluid or a distilled cyclic, with hexamethyldisiloxane to produce a mixture of linear and cyclic polymers which may be represented by the formulae:

$$Me_3SiO(Me_2SiO)_nSiMe_3 \text{ and } (Me_2SiO_2)_m$$

wherein Me represents a methyl group, and n and m are numbers representing the degree of polymerization. Other silicone fluids are obtained by copolymerization of dimethylsilicone with methylphenylsilicone, diphenylsilicone, tetrachlorophenyl siloxane, and the like. Typical silicone fluids and their method of manufacture are described in the Kirk-Othmer Encyclopedia of Chemical Technology, Second Ed., Vol. 18 (1969) at pages 221–240, which is incorporated herein by reference. Such silicone fluids are commerically available from suppliers such as Dow Corning Corp., General Electric Co. and Union Carbide Corp.

The use of solutions of tetraalkyl titanates in anhydrous, or substantially anhydrous solvents, for coating purposes has been described by Haslam in U.S. Pat. No. 2,768,909 issued Oct. 30, 1956. In that patent, the tetraalkyl titanate solution is applied to a substrate at ambient temperature, and dried by evaporation of the solvent while exposed to the atmosphere. According to the patent, moisture present in the atmosphere hydrolyzes the tetraalkyl titanate, and causes it to polymerize to form an insoluble, transparent, adherent, flexible polyoxide film. The resulting film, however, is not the same type of coating as is obtained through thermal decomposition of a tetraalkyl titanate. In particular, it is not as well bonded to the glass and thus does not provide as effective a protective coating as is obtained through thermal decomposition.

The concentration of the tetraalkyl titanate in the mixture is not highly critical, provided sufficient titanium compound is present to permit formation of a titanium coating of adequate thickness on the glassware. To some extent, this can be controlled by varying the rate of application of the mixture to the glass surface, with higher rates of application being required with more dilute solutions. In any event, the concentration of the titanium compound in the mixture, and the rate of application of the solution should be sufficient to provide an inorganic titanium coating having a thickness of at least about 25 CTU's and preferably at least about 40

CTU's, as measured with an American Glass Research, Inc. Hot End Coating Meter. The maximum thickness is not critical, although thickness in excess of about 100 to about 120 CTU's ordinarily have an iridescence which may be considered to be undesirable. It is believed that the liquid vehicle is effective because it is hydrophobic, and thus it tends to inhibit the absorption of water by the tetraalkyl titanate solution. Accordingly, the amount of vehicle should be sufficient to inhibit the absorption of water by the mixture. In general, mixtures wherein the concentration of tetraalkyl titanate is in the range of from about 25 to about 99 volume percent have been found useful, and permit practical rates of application. Preferred concentrations are in the range of from about 40 to about 80 volume percent, with a concentration of from about 50 to about 75 volume percent being especially preferred.

The mixture of the tetraalkyl titanate is applied by spraying onto the surface of glassware which has been heated at a temperature above the thermal decomposition point of the compound in question. Such procedures are well known to the art, and do not per se form a part of this invention. In general, however, the temperature of the glassware should be at least 150° C. (300° F.), preferably at least 371° C. (700° F.), and most preferably is in the range of from about 482° C. (900° F.) to about 593° C. (1100° F.). It has been found that the solid reaction product of the use of such sprays is in the form of relatively large particles which are easily removed from the air stream in which they are entrained by simple filtration. Furthermore, the presence of noxious and corrosive hydrogen chloride vapors is avoided.

After application of the titanium hot end coating in accordance with the present invention, glassware may then be provided with a "cold end" coating in accordance with known techniques.

The following examples are illustrative.

EXAMPLE I

A mixture of equal parts by volume of tetraisopropyl titanate and silicone fluid (Dow Corning 705 Diffusion Pump Fluid) was prepared and sprayed onto a glass bottle, which had been heated at 500° C.±25° C., on a rotating turntable, and the coated bottle was allowed to cool to room temperature. The resulting titanium oxide coating was continuous, clear (not hazy) and had a thickness of 50–200+ CTU's, as measured with an AGR Hot End Coating Meter.

EXAMPLE II

A mixture of equal parts by volume of tetraisopropyl titanate and olive oil (Bertolli Lucca brand) was prepared and sprayed onto a glass bottle, which had been heated at 500° C.±25° C., on a rotating turntable, and the coated bottle was allowed to cool to room temperature. The resulting titanium oxide coating was continuous, clear (not hazy) and had a thickness of 50–200+ CTU's, as measured with an AGR Hot End Coating Meter.

EXAMPLE III

A mixture of equal parts by volume of tetraisopropyl titanate and corn oil (Mazola brand) was prepared and sprayed onto a glass bottle, which had been heated at 500° C.±25° C., on a rotating turntable, and the coated bottle was allowed to cool to room temperature. The resulting titanium oxide coating was continuous, clear (not hazy) and had a thickness of 50–200+ CTU's, as measured with an AGR Hot End Coating Meter.

EXAMPLE IV

A mixture of equal parts by volume of tetraisopropyl titanate and vegetable oil was prepared and sprayed onto a glass bottle, which had been heated at 500° C.±25° C., on a rotating tunrtable, and the coated bottle was allowed to cool to room temperature. The resulting titanium oxide coating was continuous, clear (not hazy) and had a thickness of 50–200+ CTU's, as measured with an AGR Hot End Coating Meter.

EXAMPLE V

A mixture of equal parts by volume of tetraisopropyl titanate and linseed oil (Agway brand) was prepared and sprayed onto a glass bottle, which had been heated at 500° C.±25° C., on a rotating turntable, and the coated bottle was allowed to cool to room temperature. The resulting titanium oxide coating was continuous, clear (not hazy) and had a thickness of 50–200+ CTU's, as measured with an AGR Hot End Coating Meter.

What is claimed is:

1. In a method for applying an inorganic titanium-containing coating to a glass surface by contacting said surface at elevated temperature with a thermally decomposable tetraalkyl titanate, the improvement wherein said tetraalkyl titanate is applied to said surface as a mixture in a non-aqueous, normally-liquid vehicle selected from the group consisting of normally-liquid esters of fatty acids and silicon fluids.

2. The method according to claim 1 wherein the concentration of the tetraalkyl titanate is from about 25 to about 99 volume percent.

3. The method according to claim 2 wherein said vehicle is a fatty acid ester.

4. The method according to claim 3 wherein said ester is a glyceride of a fatty acid of from 15 to about 20 carbon atoms.

5. The method according to claim 2 wherein said vehicle is selected from the group consisting of vegetable oil, olive oil, corn oil, cottonseed oil, linseed oil, soybean oil, safflower oil and tung oil.

6. The method according to claim 2 wherein said vehicle is a silicone fluid.

* * * * *